United States Patent [19]

Nakagawa et al.

[11] Patent Number: 5,396,475
[45] Date of Patent: Mar. 7, 1995

[54] DISK CHANGER

[75] Inventors: Yoshiaki Nakagawa, Yokohama; Takashi Suzuki, Tokyo; Seiji Nakama, Yokohama; Masataka Kaneda, Machida; Masakazu Kashikawa; Satoshi Kawata, both of Yokohama, all of Japan

[73] Assignee: Matsushita Electric Industrial Co., Ltd., Kadoma, Japan

[21] Appl. No.: 894,929

[22] Filed: Jun. 8, 1992

[30] Foreign Application Priority Data

Jun. 20, 1991 [JP] Japan .................... 3-148765

[51] Int. Cl.$^6$ .................... G11B 17/22; G11B 23/03
[52] U.S. Cl. .................... 369/36; 369/192
[58] Field of Search ............ 369/34, 36, 178, 191, 369/192, 193, 291

[56] References Cited

U.S. PATENT DOCUMENTS

| | | | |
|---|---|---|---|
| 4,567,584 | 1/1986 | Kawakami | 369/36 X |
| 4,839,764 | 6/1989 | Ikedo et al. | 360/98.08 |
| 4,926,406 | 5/1990 | Ikedo et al. | 369/36 |
| 4,949,324 | 8/1990 | Arata | 369/36 |
| 5,107,474 | 4/1992 | Ishibashi et al. | 369/36 |
| 5,226,025 | 7/1993 | Ikedo et al. | 369/34 X |
| 5,247,500 | 9/1993 | Miyoshi et al. | 369/36 X |

FOREIGN PATENT DOCUMENTS

| | | |
|---|---|---|
| 0215767 | 9/1986 | European Pat. Off. . |
| 0424983 | 10/1986 | European Pat. Off. . |
| 2159659 | 5/1985 | United Kingdom . |

Primary Examiner—Andrew M. Dolinar
Attorney, Agent, or Firm—Popham, Haik, Schnobrich & Kaufman, Ltd.

[57] ABSTRACT

The invention is intended to simplify the mechanism of a disk changer. The disk changer includes a magazine body accommodating a plurality of trays therein, a lock piece for locking the magazine inserted into a changer body, and a tray transferring device for transferring a tray from the magazine thus locked. The tray transferring device serves to unlock the lock piece.

1 Claim, 6 Drawing Sheets

DISK CHANGER

BACKGROUND OF THE INVENTION

The present invention relates to a disk changer used in combination with a magazine accommodating a plurality of disks, such as compact disks (CD's), therein to take desired one out of the magazine for playback.

Heretofore, there are known disk changers of the type drawing out a desired one of a plurality of trays accommodated in a magazine and playing back data in a disk placed on the withdrawn tray. Such a conventional disk changer comprises a magazine locking mechanism for locking a magazine, which accommodates a plurality of trays therein, into a magazine insertion opening, a tray transferring mechanism for drawing a predetermined tray out of the magazine, a clamping mechanism for taking a disk out of the drawn tray and clamping it on a turn-table, an optical pickup for reading data from the disk rotating in conformity with rotation of the turntable, and so forth.

However, the above prior art has suffered from the problem of complicated structure because an unlocking mechanism for unlocking the magazine locked into the magazine insertion opening to eject the magazine is separately provided from the tray transferring mechanism for transferring the tray accommodated in the magazine.

SUMMARY OF THE INVENTION

The object of the present invention is to solve the above-mentioned problem in the prior art, and is to simplify the structure by making the tray transferring mechanism also serve to unlock the magazine.

To achieve the above object, according to the present invention, there is provided a disk changer comprising a magazine accommodating a plurality of trays therein, locking means for locking the magazine inserted into a changer body, and tray transferring means for transferring a tray from the magazine locked, said tray transferring means serving to unlock the locking means.

With the present invention thus arranged, a tray transferring mechanism for drawing out a tray out of the magazine and returning the tray back into the magazine is also used to unlock a magazine locking mechanism. Therefore, the need of any mechanism exclusive for unlocking is dispensed with to simplify the structure.

DETAILED DESCRIPTION OF THE PREFERRED EMBODIMENTS

Figure 1:
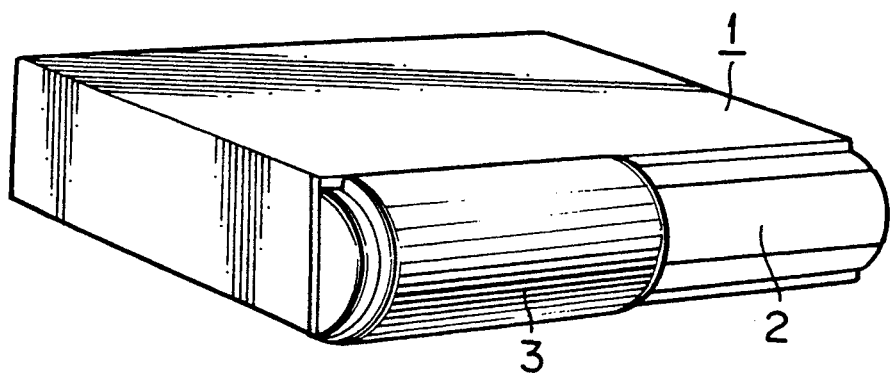
FIG. 1 is a perspective view of a disk changer according to a first embodiment of the present invention.

FIG. 1 shows an appearance of a disk changer for compact disks (CD's) according to an embodiment of the present invention. In FIG. 1, designated by the reference numeral 1 is a box-shaped housing which has a magazine insertion opening formed on the left side of its front surface 2. The reference numeral 3 designates a slide cover supported on the front surface 2 of the housing 1 in a slidable manner to the left and right for opening and closing the magazine insertion opening. FIG. 1 indicates a state that the slide cover 3 is slid to the left side of the front surface 2 with the magazine insertion opening closed.

Figure 2:
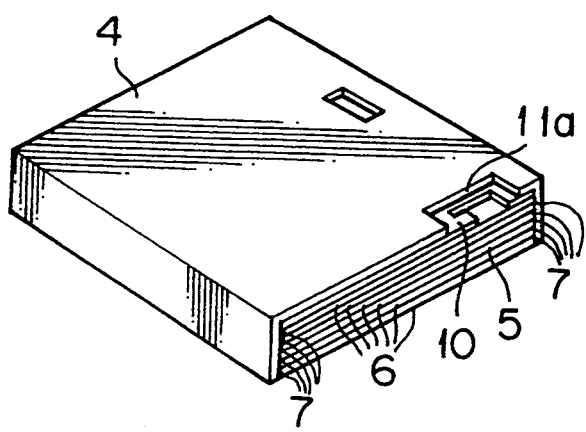
FIG. 2 is a perspective view of a magazine for use in the first embodiment.
Figure 3:
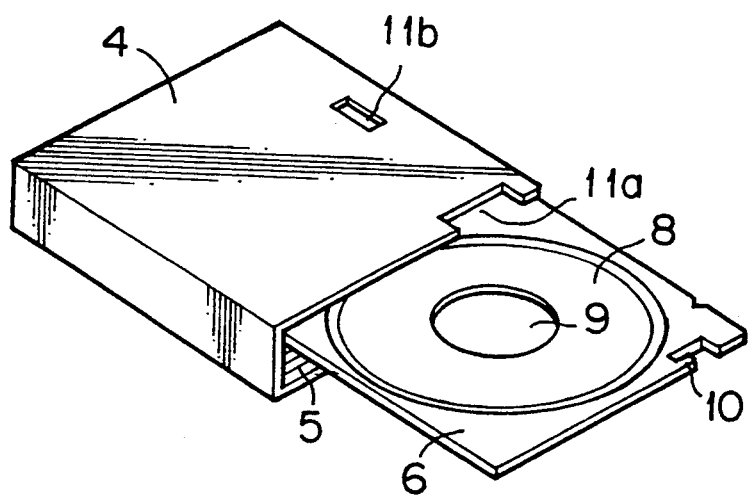
FIG. 3 is a perspective view showing a state that a tray is drawn out of the magazine for use in the first embodiment.

FIGS. 2 and 3 show a magazine accommodating a plurality of CD's therein. In these drawings, designated by the reference numeral 4 is a box-shaped magazine body and 5 is an opening defined on one lateral side of the magazine body 4. On the inner wall surfaces of the magazine body 4, a plurality of guide pieces 7 are formed in parallel for guiding respective trays 6. A recess 8 is formed on the upper surface of each tray 6 to accommodate the CD therein, and is formed centrally with a hole 9. The reference numeral 10 designates an hook lug formed at a front edge of the tray 6. A pawl of a tray drawing mechanism is engaged with the hook lug 10 for drawing the tray 6 out of the magazine body 4 or returning the tray 6 back into the magazine body 4. The reference numeral 11a designates a cutout formed in the magazine body 4 and the reference numeral 11b designates a recess formed on the upper surface of the magazine body 4 for locking the magazine. In the disk changer of FIG. 1, the slide cover 3 is slid to the right to open the magazine insertion opening, and the magazine shown in FIG. 2 is inserted into the magazine insertion opening. The magazine body 4 thus inserted in place is locked within the housing 1 by a locking mechanism. The magazine shown in FIG. 2 is received in the left side of the housing 1 shown in FIG. 1, while the housing 1 accommodates in the right side thereof an elevating plate capable of moving up and down, a tray transferring mechanism provided on the elevating plate, a turntable for driving the CD to rotate, a clamping mechanism for clamping the CD on the turntable, an optical pickup for reading data recorded on the CD, and so forth.

Figure 4:
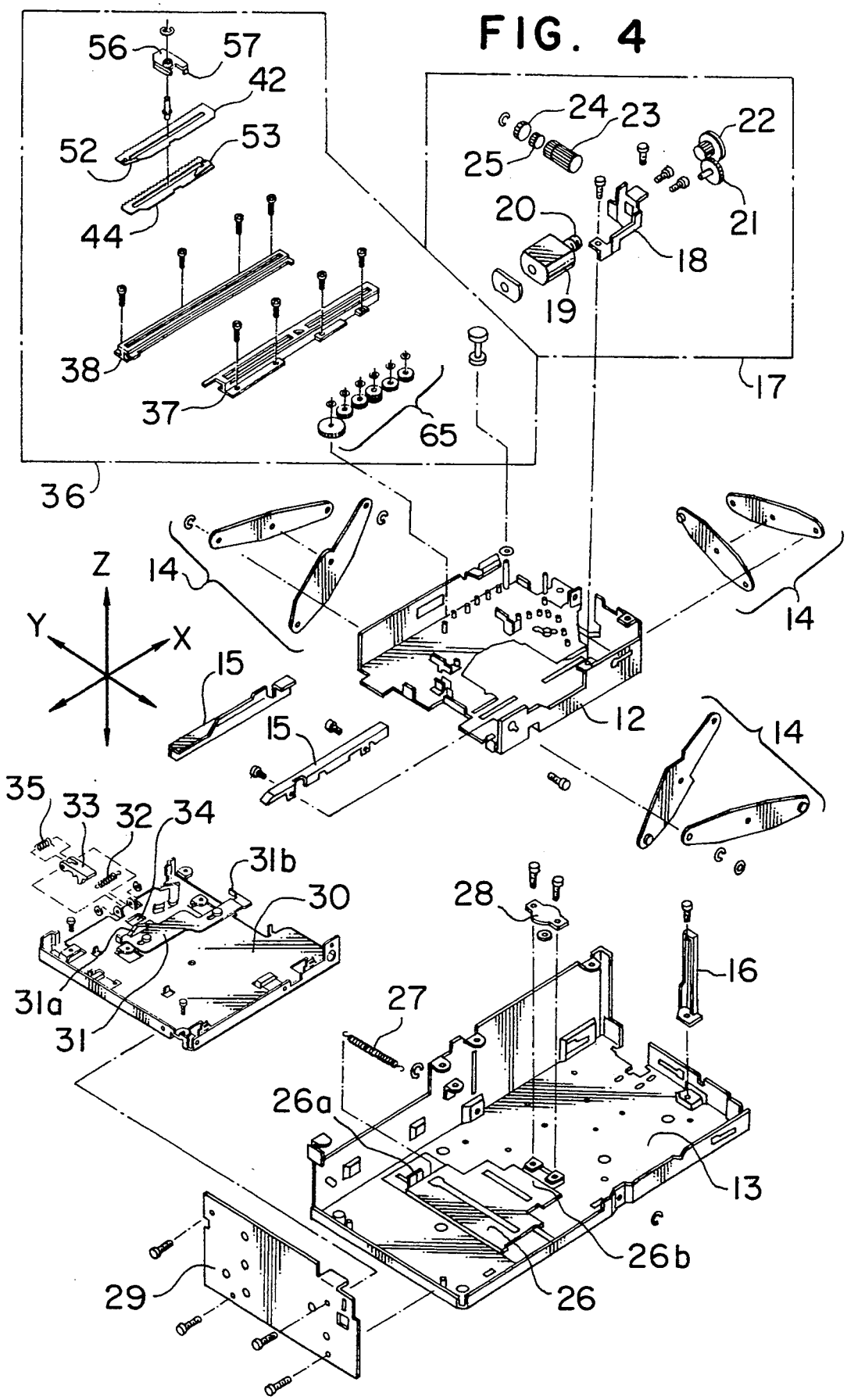
FIG. 4 is an exploded perspective view of an essential part of the first embodiment.

FIG. 4 shows an essential part of this embodiment. In FIG. 4, designated by the reference numeral 12 is an elevating plate supported in a chassis 13 to be movable vertically (in the direction of arrow Z), and 14 is an X-shaped arm comprising two arms pivotally supported to each other at their centers. Of four ends of the X-shaped arm 14, three ends are pivotally supported on the elevating plate 12 and the chassis 13, while a pin provided on the remaining one is inserted in an elongate hole formed in a side panel of the chassis 13. Three sets of X-shaped arms 14 allows the elevating plate 12 to move up and down in parallel with the chassis 13. The reference numeral 15 designates a tray guide member fixed to the inner surface of a side panel of the elevating plate 12. The reference numeral 16 designates a rack fixed to the chassis 13 and held in mesh with a gear of a drive mechanism 17 which is provided on the elevating plate 12. The drive mechanism 17 comprises a fitting 18 screwed onto the elevating plate 12, a motor 19 fixed to the fitting 18, a helical gear 20 fixed to a rotatable shaft of the motor 19, and gears 21, 22, 23, 24 rotatably supported on the fitting 18. The gears 23, 24 are both held in mesh with the rack 16. The reference numeral 25 designates a leaf spring interposed between the gears 23 and 24 to eliminate backlash between the rack 16 and the gear 23. A torque of the motor 19 is transmitted through the helical gear 20, a helical gear portion of the gear 21, a spur gear portion of the gear 21, a spur gear portion of the gear 22, a worm gear portion of the gear 22, a helical gear portion of the gear 23, and a spur gear portion of the gear 23 in this order. The reference numeral 26 designates a slide plate supported on the bottom surface of the chassis 13 slidably in the direction of arrow Y. A spring 27 is mounted under tension between the slide plate 26 and the chassis 13 so that the slide plate 26 is normally biased by the spring 27 in the direction of arrow Y. The reference numeral 26a designates a projection formed integrally on one end of the slide plate 26. The magazine body 4 inserted through the magazine insertion opening abuts against the projection 26a, causing the slide plate 26 to slide in the direction of arrow Y against the resilient force of the spring 27. The reference numeral 26b designates a rack formed on the slide plate 26 and held in mesh with a damper gear 28 fixed to the chassis 13. The reference numeral 29 designates a side panel fixed to the chassis 13 and 30 is a base plate screwed onto the chassis 13 and the side panel 29, and the magazine body 4 is inserted between the base plate 30 and the chassis 13. The reference numeral 31 designates an unlock lever supported on the base plate 30 slidably in the direction of arrow X and normally biased by a spring 32. The reference numeral 33 designates a lock plate rotatably supported on the base plate 30 and having a pawl which projects from the underside of the base plate 30 through a hole 34 formed therein for engagement in the recess 11b of the magazine body 4 to lock the magazine body 4. The reference numeral 35 designates a spring for normally biasing the lock piece 33. The reference numeral 31a designates a projection formed on a portion of the unlock lever 31. The projection 31a is movable in the direction of arrow X together with the unlock lever 31 to push a distal end portion of the lock piece 33 from the underside so that the lock piece 33 is rotated to release the magazine from a locked state by the lock piece 33.

Figure 5:
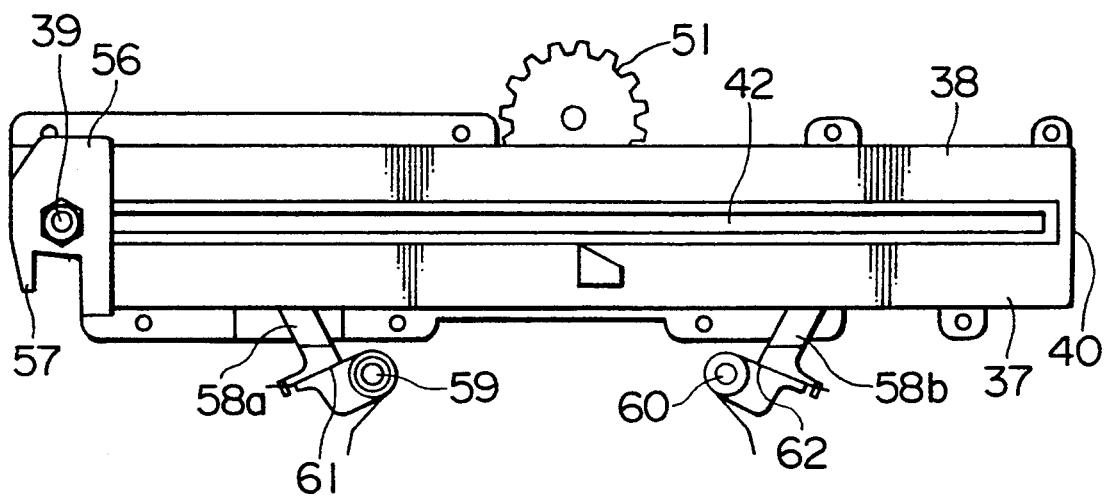
FIG. 5 is a top plan view of a tray transferring mechanism in the first embodiment.
Figure 6:
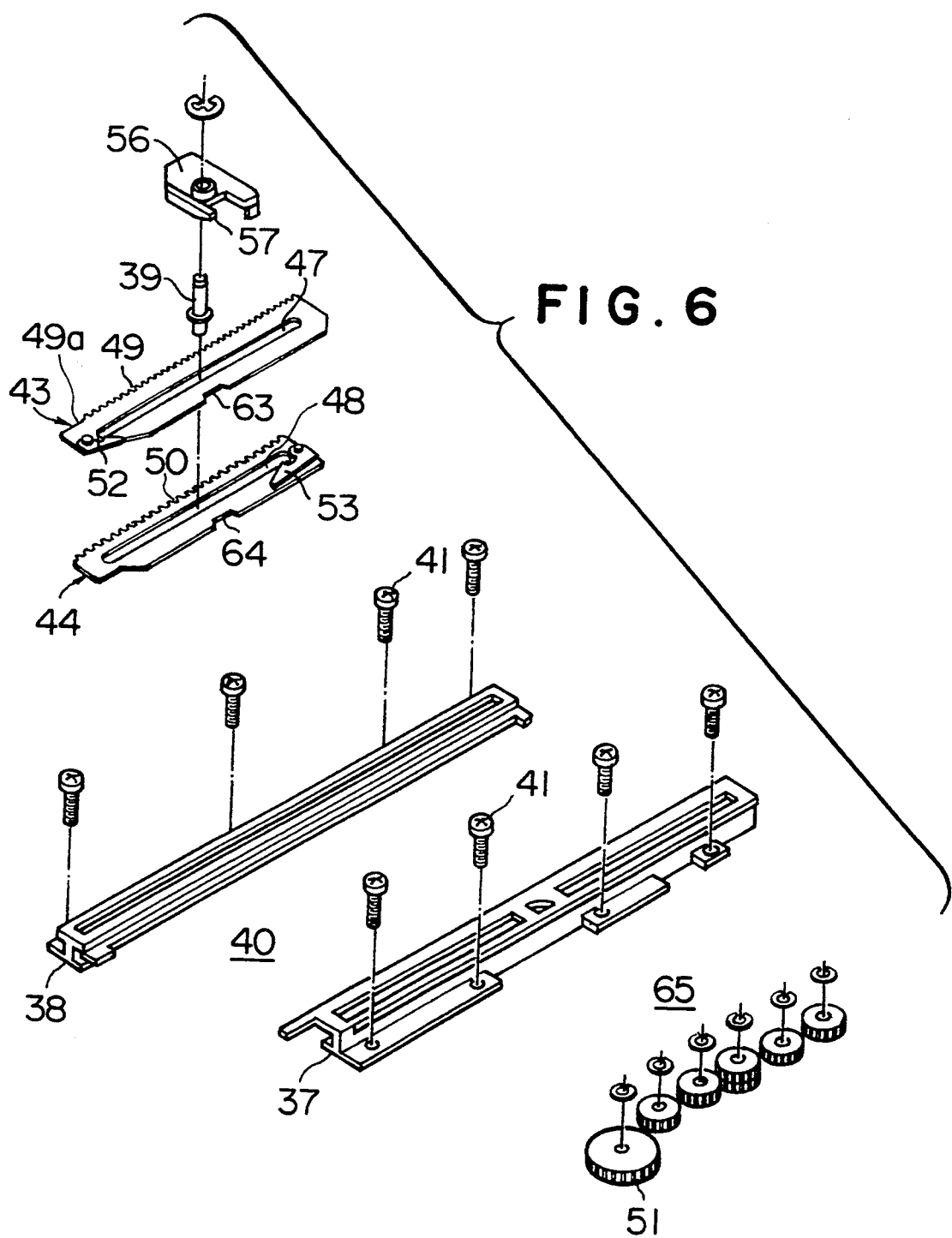
FIG. 6 is an exploded perspective view of the tray transferring mechanism in the first embodiment.

In FIG. 4, designated by the reference numeral 36 is a tray transferring mechanism. The tray transferring mechanism of this embodiment will be next described with reference to FIGS. 5 to 7 as well. The reference numeral 37, 38 designate respectively first and second guide pieces jointly constituting a guide member 40 which guides a pin 39 in the direction of arrow X. These guide pieces 37, 38 are fixed to the upper surface of the elevating plate 12 by screws 41. A guide hole 42 is formed between the first guide piece 37 and the second guide piece 38. The reference numerals 43, 44 designate respectively first and second rack plates capable of sliding in the direction of an arrow X while being guided by two guide grooves 45, 46 (see FIG. 7) formed in the guide pieces 37, 38. The reference numerals 47, 48 designate elongate holes respectively formed in the rack plates 43, 44 with a pin 39 inserted through these elongate holes 47, 48. The reference numerals 49, 50 designate toothed portions respectively formed on one sides of the rack plates 43, 44. These toothed portions 49, 50 are both adapted to mesh with a gear 51 at the final stage of a gear train 65 rotatably supported on the elevating plate 12. The reference numeral 52 designates a latch pawl rotatably supported on one end (the left end in FIG. 6) of the upper surface of the rack plate 43 and the reference numeral 53 designates a latch pawl rotatably supported on one end (the right end in FIG. 6) of the lower surface of the rack plate 44. The latch pawls 52, 53 are respectively turned while being guided by guide surfaces 54, 55 (see FIG. 7) formed in the guide pieces 37, 38 to latch or release the pin 39. The reference numeral 56 designates a slide member provided with a pawl 57 which is adapted to engage with the hook lug 10 of the tray 6. In FIG. 5, the reference numerals 58a, 58b designate lock pieces rotatably supported on the upper surface of the elevating plate 12 by shafts 59, 60 and the reference numerals 61, 62 designate springs for normally biasing the lock pieces 58a, 58b, respectively. The lock pieces 58a, 58b are engaged with cutouts 63, 64 of the rack plates 43, 44 for slightly locking the rack plates 43, 44, respectively. Upon rotation of the gear 51, the tray transferring mechanism slides the slide member 56 between the left and right ends of the guide hole 42 in FIG. 5. This sliding movement allows the tray 6 engaging with the pawl 57 of the slide member 56 to come into or out of the magazine.

Operation of the disk changer of this embodiment will be next described. As the magazine body 4 is inserted through the magazine insertion opening, the front edge of the magazine body 4 abuts against the projection 26a on the slide plate 26 which is normally biased by the spring 27. By further inserting the magazine body 4 against the resilient force of the spring 27, the lock piece 33 engages in the recess 11b formed in the upper surface of the magazine body 4, thereby locking the magazine body 4 in the housing 1. When a predetermined disk in the magazine is now instructed, the elevating plate 12 is moved upwardly or downwardly so that the pawl 57 of the slide member 56 engages with the hook lug 10 of the tray 6 on which the instructed disk is placed. At the same time, an electric current is supplied to a motor for rotation thereof, and a torque of the motor is transmitted to the gear 51 through the gear train 65 for drawing out the instructed tray 6 out of the magazine body 4.

Figure 7:
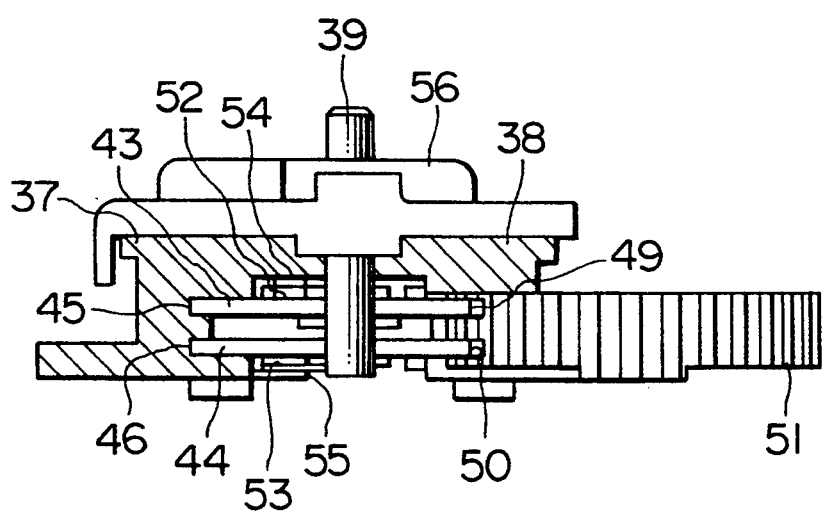
FIG. 7 is a side view, partly in section, of the tray transferring mechanism in the first embodiment.
Figure 8:
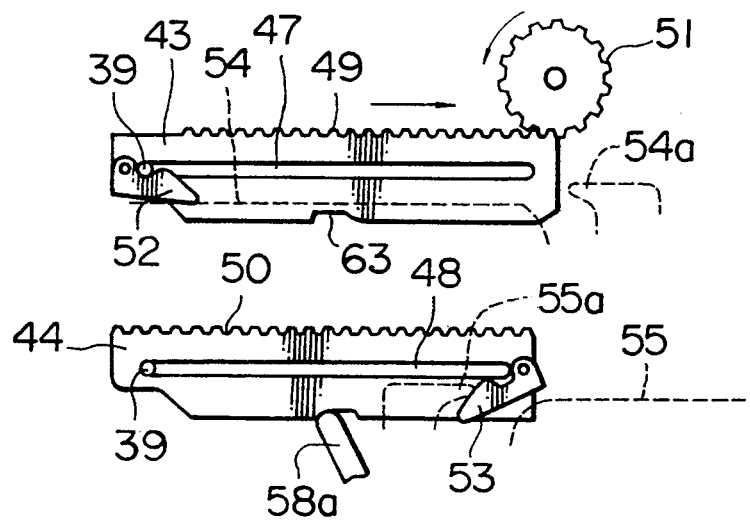
FIG. 8 is a view for explaining operation of the tray transferring mechanism in the first embodiment.
Figure 9:
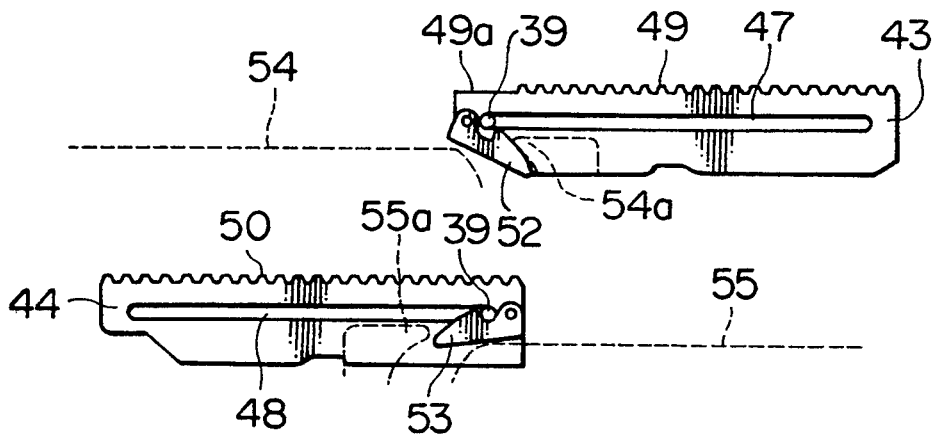
FIG. 9 is a view for explaining operation of the tray transferring mechanism in the first embodiment.
Figure 10:
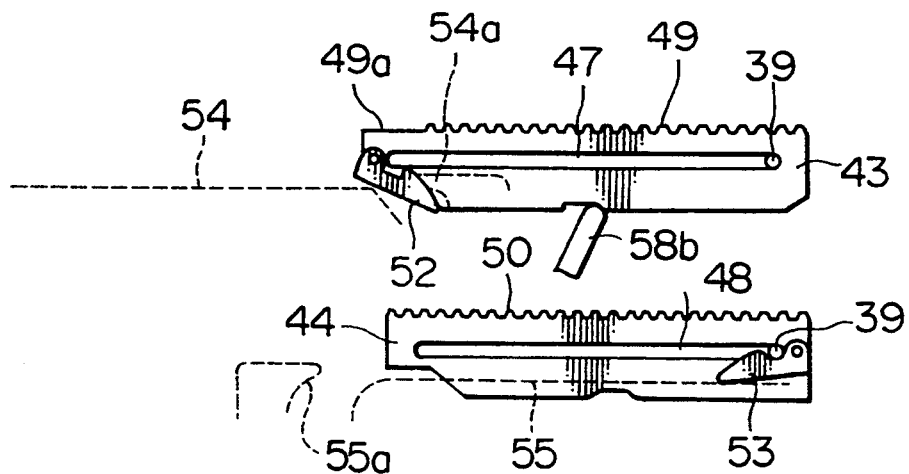
FIG. 10 is a view for explaining operation of the tray transferring mechanism in the first embodiment.
Figure 11:
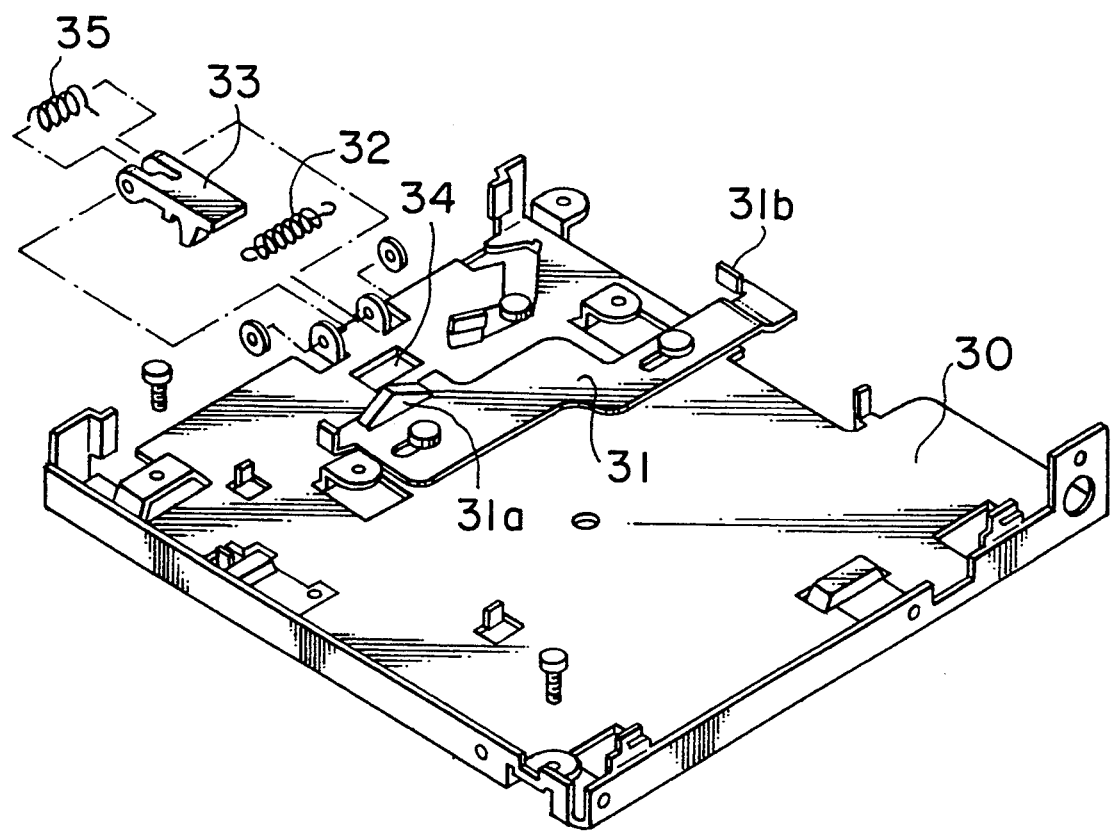
FIG. 11 is a perspective view of a magazine locking mechanism in the first embodiment.

Operation of the tray transferring mechanism will be next described with reference to FIGS. 8 to 10 as well. It is to be noted that although the rack plates 43, 44 are arranged one above the other as shown in FIG. 7, they are shown as not overlapping with each other in FIGS. 8 to 10 for convenience of illustration. FIG. 8 shows a state that the slide member 56 is positioned close to the magazine body 4 as shown in FIG. 5. In this state, the latch pawl 52 of the first rack plate 43 is turned counterclockwise by the guide surface 54 with the pin 39 held between the latch pawl 52 and the left end of the elongate hole 47. Therefore, when the gear 51 is rotated counterclockwise, the first rack plate 43 held in mesh with the gear 51 slides to the right. Correspondingly, the pin 39 also moves to the right together with the rack plate 43. Because the pin 39 is inserted through a hole in the slide member 56, the rightward movement of the pin 39 causes the slide member 56 to move to the right, whereby the tray 6 engaging with the pawl 57 of the slide member 56 is drawn out of the magazine body 4. At this time, since the second rack plate 44 is not held in mesh with the gear 51, the second rack plate 44 will not move to the right and remains stationary in spite of the rightward movement of the first rack plate 43. When the first rack plate 43 is further moved to the right, as shown in FIG. 9, the latch pawl 52 supported by the first rack plate 43 strikes against a projection 54a of the guide surface 54, so that the latch pawl 52 is turned clockwise to be disengaged from the pin 39. Also, when the first rack plate 43 comes to the position shown in FIG. 9, the gear 51 does not mesh with the first rack plate 43 any longer and the driving of the first rack plate 43 by the gear 51 is completed. The reference numeral 49a denotes a non-toothed portion of the first rack plate 43. During the time in which the first rack plate 43 moves from the position shown in FIG. 8 to the position shown in FIG. 9, the pin 39 is moved to the right in the elongate hole 48 of the second rack plate 44 kept in rest and then strikes against the right end of the elongate hole 48, and then the second rack plate 44 is moved to the right by the pin 39 to come into mesh with the gear 51. Simultaneously, the latch pawl 53 supported by the second rack plate 44 is turned clockwise by the guide surface 55. Therefore, the pin 39 is now held between the latch pawl 53 and the right end of the elongate hole 48. Thus, the gear 51 is switched over from meshing with the first rack plate 43 to meshing with the second rack plate 44 and the pin 39 is also switched over from engaging with the first rack plate 43 to engaging with the second rack plate 44. Subsequent to the state shown in FIG. 9, the second rack plate 44 is slid to the right by the torque of the gear 51 for further rightward movement of the pin 39. When the second rack plate 44 reaches the position shown in FIG. 10, the slide member 56 actuates a switch (not shown) to stop the rotation of the motor and hence the movement of the second rack plate 44. In this way, the pin 39 is moved from the left end of the guide hole 42 shown in FIG. 8 to the right end thereof shown in FIG. 10, and the tray 6 is drawn out of the magazine by the slide member 56 engaging with the pin 39. Thereafter, the disk placed on the tray 6 is held between the turntable and the clamper. The disk is driven by the turntable to rotate so that data recorded on the disk is read by the optical pickup. After the playback operation, the tray 6 is returned back into the magazine in a reversed manner to the above operation of drawing the tray. Thus, by rotating the gear 51 clockwise, the tray returning operation proceeds in sequences shown in FIG. 10, FIG. 9 and FIG. 8, in this order.

When the tray 6 is returned back into the magazine body 4 and an eject switch is actuated, the elevating plate 12 is raised and stopped at the position where the pawl 57 of the slide member 56 engages with a hook 31b of the unlock lever 31. An electric current is now supplied to the motor again, and the gear 51 is rotated to slide the first rack plate 43 similarly to the tray drawing operation. This movement of the first rack plate 43 also moves the slide member 56, so that the unlock lever 31 engaging with the pawl 57 of the slide member 56 is moved against the resilient force of the spring 32. As the unlock lever 31 moves, the projection 31a thereof is also moved to cause the inclined surface of the projection 31a to abut against the underside of the lock piece 33, thus causing the lock piece 33 to rotate against the resilient force of the spring 35. Therefore, the lock piece 33 is disengaged from the recess 11b of the magazine body 4, so that the magazine body 4 is ejected out of the magazine insertion opening by the slide plate 26 which is normally biased by the resilient force of the spring 27. Because the damper gear 28 is held in mesh with the rack 26b of the slide plate 26, the operation of ejecting magazine is slowly performed.

According to the illustrated embodiment, as mentioned above, the tray transferring mechanism 36 for transferring trays is also used to drive the unlock lever 31 for releasing the lock piece 33 from the recess 11b of the magazine body 4. As a result, a specific drive mechanism exclusive for unlocking the magazine is dispensed with to simplify the structure and reduce the size of a disk changer.

What is claimed is:

1. A disk changer comprising a magazine accommodating a plurality of trays therein, locking means for locking said magazine inserted into a changer body, and tray transferring means for transferring a tray from said locked magazine, said tray transferring means serving to unlock said locking means, wherein said tray transferring means comprises first and second rack members supported in a slidable manner, a drive source for driving said first and second rack members, a first latch member for latching a driven member at one end side of said first rack member, a second latch member for latching said driven member at the other end side of said second rack member, and latching switchover means for switching over said driven member to be latched on the other rack member when one of said rack members latching said driven member thereon has moved to a predetermined position.

* * * * *